United States Patent [19]

Obermayer et al.

[11] 4,412,513
[45] Nov. 1, 1983

[54] WATER-COOLED INTERNAL COMBUSTION ENGINE WITH DIRECT FUEL INJECTION

[75] Inventors: Bertram Obermayer; Josef Greier, both of Graz; Walter Mandl, St. Pölten, all of Austria

[73] Assignees: Simmering-Graz-Pauker AG, Vienna; AVL Gesellschaft für Verbrennungskraftmaschinen und Messtechnik mbH, Graz, both of Austria

[21] Appl. No.: 232,550

[22] Filed: Feb. 9, 1981

[30] Foreign Application Priority Data

Feb. 8, 1980 [AT] Austria ............................ 704/80

[51] Int. Cl.³ ...................... F02M 39/02; F02B 67/02
[52] U.S. Cl. ............................ 123/55 VE; 123/508; 123/509
[58] Field of Search ............... 123/508, 509, 55 VF, 123/55 VE, 55 VS, 55 V

[56] References Cited

U.S. PATENT DOCUMENTS

| | | | |
|---|---|---|---|
| 1,582,763 | 4/1926 | Lafitte | 123/55 V |
| 2,681,050 | 6/1954 | Schnürle et al. | 123/55 VE X |
| 2,782,776 | 2/1957 | Kremser | 123/55 VF |
| 2,921,567 | 1/1960 | Medenus | 123/55 VF |

FOREIGN PATENT DOCUMENTS 804024 10/1936 France .................. 123/509

Primary Examiner—Tony M. Argenbright
Attorney, Agent, or Firm—Watson, Cole, Grindle & Watson

[57] ABSTRACT

A water-cooled internal combustion engine with direct fuel injection and in which the cylinders are arranged in banks forming the shape of a V, the V-shape space between the cylinder banks is adapted as a receiving chamber for combustion air and for the accommodation of means for fuel injection by individual pumps associated with each cylinder. The provision of a single camshaft is arranged parallel to the cylinder banks and centrally above the receiving chamber and in that the push rods of the inlet and exhaust valves as well as the individual pumps are directly driven by the camshaft.

2 Claims, 2 Drawing Figures

WATER-COOLED INTERNAL COMBUSTION ENGINE WITH DIRECT FUEL INJECTION

BACKGROUND OF THE INVENTION

The invention relates to a water-cooled internal combustion engine with direct fuel injection and in which the cylinders are arranged in banks forming the shape of a V, the V-space between the cylinder banks being adapted as a receiving chamber for combustion air and for the accommodation of means for fuel injection by individual pumps associated with each cylinder.

In known internal combustion engines of this kind it is customary to provide two camshafts which are arranged on that side of each cylinder bank which is remote from the V-space between the cylinder banks. The individually associated injection pumps which are driven by the camshafts are then arranged in such a way that their axes extend substantially parallel to the respectively associated cylinder axes. The push rods for valve actuation are arranged between the individual injection pumps and actuate the valves through upper rocker levers.

This known arrangement has the drawback that the two camshafts, due to their being mounted laterally beside the cylinders and the correspondingly appropriate arrangement of the injection pumps and valve drive mechanism, extend substantially the overall width dimensions of the engine and also increase production costs. Furthermore, due to the fact that for good drive transmission the camshafts must be arranged comparatively near to the crankshaft which drives them, the valve push rods must be longer, which naturally has an adverse effect on the positiveness and accuracy of the valve actuation.

SUMMARY OF THE INVENTION

It is the aim of the present invention to improve internal combustion engines of the kind specified in such a way as to avoid the above-mentioned disadvantages and to reduce the overall width of the engines as a whole despite the fact that the individual injection pumps are so arranged that it is possible to use short injection pipes.

According to the invention this aim is achieved by the provision of a single camshaft arranged parallel to the cylinder banks and centrally above the receiving chamber and by the fact that, in a manner known per se, the push-rods for the inlet and exhaust valves as well as the individual injection pumps are driven directly by the camshaft. In this way it is possible, on the one hand, to dispence with one of the camshafts including all associated bearings, lubricating points, drive elements, etc, and, on the other hand, to reduce the overall width of the engine by arranging the single camshaft above the receiving chamber and centrally between the cylinder banks. The arrangement further results in very short fuel-pressure lines between the injection nozzles and the individual injection pumps which, moreover, may be of equal length for all cylinders. The pumps are directly driven by the central camshaft and are, moreover, directly accessible from above together with the associated adjusting and fuel supply means, in a manner which is extremely favorable for initial assembly and periodical maintenance work. Due to the central disposition of the camshaft, the overall width of the engine is, moreover, not increased by the associated drive means. A further advantage of the arrangement according to this invention resides in the shortening of the valve-drive push rods and resulting greater rigidity thereof, which means improved accuracy in valve actuation and therefore faster valve opening times amounting in all to a better and more efficient filling of the combustion space.

According to a further aspect of the invention the camshaft and the individual injection pumps may be accommodated in a common housing which interconnects the two cylinder banks and is formed in one piece with the cylinder block. The mutual connection of the cylinder banks through this housing achieves a substantial improvement in rigidity and bracing of the two cylinder banks in V-formation which, last but not least, also permits a reduction in wall thickness in this region and thus a significant saving in weight.

According to a further aspect of the invention an upper wall of the receiving chamber forms the lower wall of the housing in which the camshaft and pumps are mounted and is arranged in the region of the upper ends of the cylinder facing the V-space. Due to the provision of the upper wall of the V-space at the highest point between the cylinder banks, overall rigidity of the construction is still further improved in this region and this enables the camshaft bearings and the tappet guides as well as the individual pumps to be arranged in the housing which is defined on the underside by the upper wall of the V-space without provision of further bracing and stiffening elements for the camshaft bearings. Thus the V-space between cylinder banks is optimally utilized and the various parts for valve actuation and fuel injection are optimally accommodated without increasing the overall outside dimensions of the engine.

BRIEF DESCRIPTION OF THE DRAWINGS

The invention is hereinafter more specifically described with reference to an embodiment shown by way of example in the accompanying drawings wherein.

DESCRIPTION OF THE PREFERRED EMBODIMENT

Figure 1:
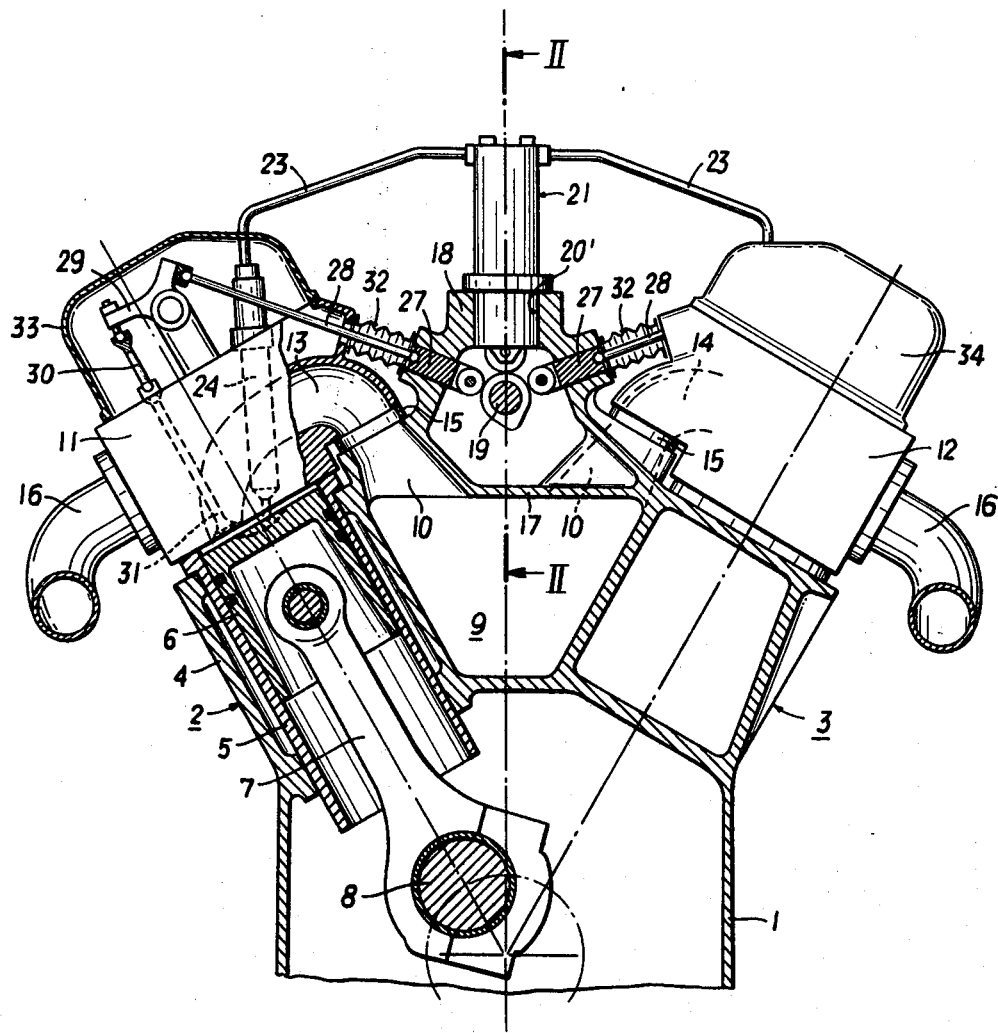
FIG. 1 is a partial section through a schematically represented embodiment of an internal combustion engine according to this invention.

The internal combustion engine according to FIG. 1 comprises a crankcase 1 in which the crankshaft (not shown) is mounted and which is made in one piece with the cylinder block mounting the two banks of cylinders 2 and 3.

The individual cylinder liners 5 are mounted on the outer part 4 of each cylinder bank 2 and 3, which at the same time forms the cooling water jacket, and into which pistons 6, only one of which is indicated, are received and connected to the crank pin 8 by means of the connecting rod 7.

The V-space between the cylinder banks 2 and 3 is formed as a receiving chamber 9 for the combustion air. The combustion air is induced into the receiving chamber 9 in a manner not further described and is distributed through the short connecting passages 10 to the individual cylinders.

Each of the two cylinder banks 2 and 3 mounts a cylinder head 11 and 12, respectively, which seals the combustion chambers of the cylinders and which is fixed to the crankcase in a way which is not shown.

Each cylinder head 11, 12 has one inlet passage 13, 14, respectively, which is connected to the respective short connecting passage of the receiving chamber 9 with interposition of a washer 15. The exhaust passage (not shown) of each cylinder opens into an exhaust stub 16.

Above the receiving chamber 9, the a flat upper wall 17 of which is disposed in the region of the V-space adjacent to the upper ends of the cylinders, there is mounted a housing 18 which forms one piece with the cylinder block or the two cylinder banks 2 and 3, respectively, and the bottom of which is formed directly by the top wall 17 of the receiving chamber.

Figure 2:
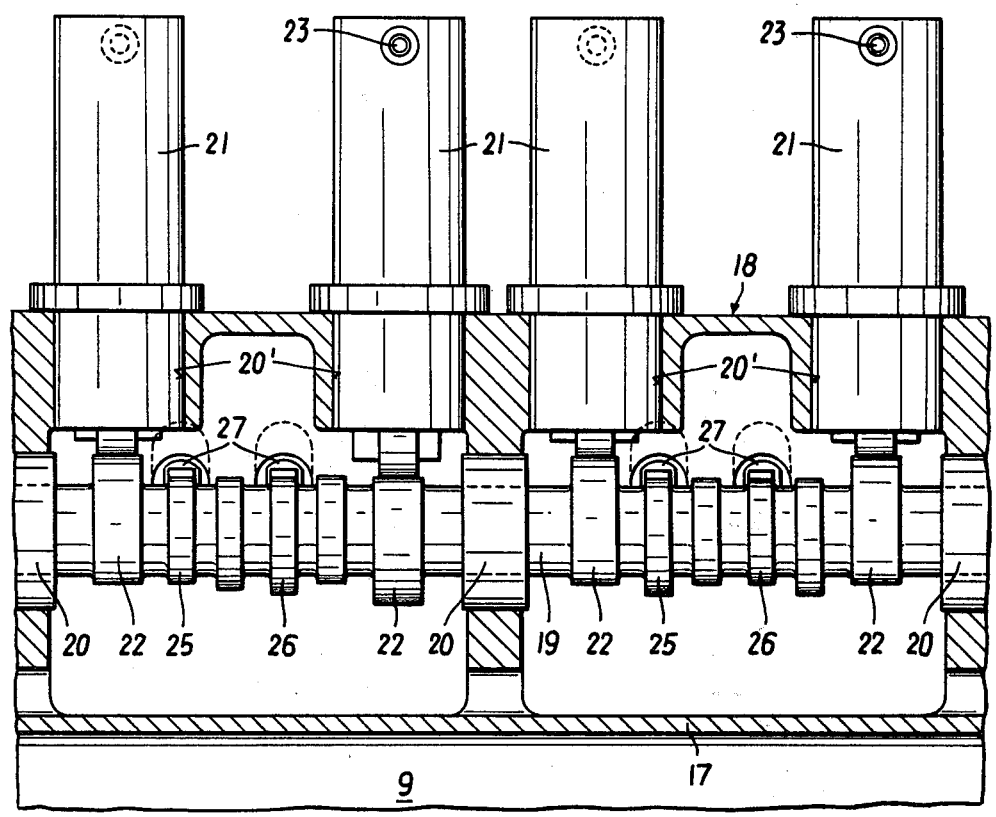
FIG. 2 is a partial section taken on line II—II in FIG. 1 on a different scale.

The single camshaft 19 lies parallel to the cylinder banks 2 and 3 and centrally over the receiving chamber 9 in the housing 18 and, as especially shown in FIG. 2, comprises three cams for each cylinder. The camshaft 19 is supported in the housing 18 at three places 20 and is driven by the combustion engine in a manner not shown.

Also, in receiving bores 20' in the housing 18 are arranged individual pumps 21 for direct duel injection into each cylinder and which are directly actuated by the camshaft 19 through the cams 22. The individually associated injection pumps 21 extend in a row above the camshaft 19 between the two cylinder banks 2 and 3, with the result that the pressure lines 23 to the individual injection jets 24 of each cylinder are short and of equal length and therefore injection behaviour is improved. Furthermore, due to this arrangement on the upper part of the engine, the routing of fuel feed pipes to the pumps 21 and connection or fitting of the adjusting linkage, not shown, is greatly facilitated.

The other two cams 25 and 26 for each cylinder are used for valve actuation. The roller followers 27 which co-act respectively with cams 25 and 26 are conducted laterally through the housing 18 and drive the push rods 28 which actuate the valves 31 via a rocker arm 29 and spacer element 30. That part of the push rod 28 which extends between the housing 18 and the entry to the cylinder head 11, or 12, is sealed to the exterior by means of a concertina boot 32.

Rocker covers 33, 34, are fitted on the top of each cylinder head 11, 12 and sealed to prevent oil leakage from this region.

Due to the arrangement of the upper wall 17 of the space 9 in the region of the upper ends of the cylinders which is directed towards the V-space and which at the same time constitutes the lower wall of housing 18, substantial stiffening of the cylinder block or relative bracing of the two cylinder banks 2 and 3 has been achieved which enables the camshaft 19 to be mounted above the space 9 in the manner hereinbefore described without special constructional provisions, with the added advantage of shorter push rods 28 and improved precision in valve actuation.

What is claimed is:

1. A water-cooled, four stroke internal combustion engine which includes
   a V-shaped cylinder block which includes a number of cylinders, the cylinders being arranged in two banks, said V-shaped cylinder block defining a V-shaped space between the two cylinder banks therein, the cylinders in each said bank being spaced apart and including operable inlet and exhaust valves at their upper ends and individual liners which define coolant spaces therearound,
   flat upper wall means extending from said cylinder banks at a point coincident with the upper ends of the cylinders in each said bank across the V-shaped space so as to form a receiving chamber for combustion air therewith, said wall means being unitary with the cylinder block and providing structural reinforcement thereto,
   means forming a housing above the receiving chamber in the V-shaped space, said upper wall means also constituting the lower wall of the housing, said means forming the housing also being unitary with the cylinder block,
   a camshaft located within said housing and centrally positioned above the receiving chamber, said camshaft being oriented in parallel with said cylinder banks in the cylinder block,
   a number of push rods, each push rod extending between a respective inlet valve and exhaust valve of a cylinder to a point cooperable with the camshaft in the housing, and
   a number of individual pumps, each pump being cooperable with the camshaft in the housing for injecting fuel into a respective cylinder.

2. A water-cooled, four stroke internal combustion engine as defined in claim 1 including separate means forming connecting passages which respectively extend from said flat upper wall means to respective cylinders so as to enable combustion air to pass from said receiving chamber to each said cylinder.

* * * * *